(12) United States Patent
Honda et al.

(10) Patent No.: US 7,865,082 B2
(45) Date of Patent: Jan. 4, 2011

(54) OPTICAL RECEIVER AND CONTROLLING METHOD THEREOF, AND OPTICAL TRANSMISSION SYSTEM

(75) Inventors: Toshiki Honda, Kawasaki (JP); Takeshi Ono, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 588 days.

(21) Appl. No.: 12/003,766

(22) Filed: Dec. 31, 2007

(65) Prior Publication Data
US 2008/0187323 A1    Aug. 7, 2008

(30) Foreign Application Priority Data
Feb. 6, 2007    (JP)    ............... 2007-026772

(51) Int. Cl.
*H04B 10/00* (2006.01)
*H04B 10/08* (2006.01)
*H04B 10/12* (2006.01)
*H04J 14/02* (2006.01)

(52) U.S. Cl. .................. 398/81; 398/29; 398/33; 398/147; 398/149; 398/159

(58) Field of Classification Search ............... 398/25, 398/29, 33, 81, 147–149, 158, 159
See application file for complete search history.

(56) References Cited

U.S. PATENT DOCUMENTS

| 5,717,510 A | 2/1998 | Ishikawa et al. |
| 5,754,322 A | 5/1998 | Ishikawa et al. |
| 5,760,937 A * | 6/1998 | Ishikawa et al. ............ 398/98 |
| 5,815,294 A | 9/1998 | Ishikawa et al. |
| 5,870,213 A | 2/1999 | Ishikawa et al. |
| 5,896,217 A | 4/1999 | Ishikawa et al. |
| 5,909,297 A | 6/1999 | Ishikawa et al. |
| 5,991,477 A | 11/1999 | Ishikawa et al. |
| 2002/0030877 A1 * | 3/2002 | Way et al. ............ 359/183 |
| 2003/0007216 A1 | 1/2003 | Chraplyvy et al. |
| 2004/0081470 A1 | 4/2004 | Griffin |
| 2004/0223769 A1 | 11/2004 | Hoshida |

FOREIGN PATENT DOCUMENTS

CA    2432007    6/2002

(Continued)

*Primary Examiner*—Dalzid Singh
(74) *Attorney, Agent, or Firm*—Staas & Halsey LLP

(57) ABSTRACT

The optical transmitter and receiver of the invention includes: a variable dispersion compensator that performs wavelength dispersion compensation on an optical signal of a differential M-phase modulation format input from a transmission path; an optical amplifier that compensates an optical loss in the variable dispersion compensator; a delay interferometer that delays and interference processes the optical signal output from the optical amplifier; and a photoelectric conversion circuit that photoelectric converts the output light from the delay interferometer to generate a demodulated electric signal. The output level of the optical amplifier is decreased at the time of start up to deteriorate the OSNR of the optical signal input to the photoelectric conversion circuit, to thereby realize a state in which an error occurs more easily, and then optimization control of the variable dispersion compensator and the delay interferometer is started. As a result optimization of the dispersion compensation amount and the phase control amount in the optical receiver corresponding to the differential M-phase modulation format can be performed in a short time.

13 Claims, 11 Drawing Sheets

FOREIGN PATENT DOCUMENTS

| | | |
|---|---|---|
| CA | 2384234 | 12/2002 |
| GB | 2370473 | 6/2002 |
| JP | 8-321805 | 12/1996 |
| JP | 2000-115077 | 4/2000 |
| JP | 2003-60580 | 2/2003 |
| JP | 2004-516743 | 6/2004 |
| WO | 02/51041 A2 | 6/2002 |
| WO | 02/51041 A3 | 6/2002 |

* cited by examiner

US 7,865,082 B2

OPTICAL RECEIVER AND CONTROLLING METHOD THEREOF, AND OPTICAL TRANSMISSION SYSTEM

BACKGROUND OF THE INVENTION

1. Field of the Invention

The present invention relates to an optical receiver and a controlling method thereof, used for an optical transmission system, and more specifically, relates to a control technique for optimizing a dispersion compensation amount and a phase control amount in an optical receiver corresponding to a differential M-phase modulation format.

2. Description of the Related Art

Recently, there are high demands for introduction of a next-generation optical transmission system corresponding to a transmission speed of, for example, 40 Gb/s (gigabits per second), and further, the same transmission distance and frequency efficiency as those of a 10 Gb/s system are required for the optical transmission system. As a means for realizing such a demand, there are active research and development of Return to Zero-Differential Phase Shift Keying (RZ-DPSK) or Carrier-suppressed (CS) RZ-DPSK modulation format, which are excellent in Optical Signal-to-Noise Ratio (OSNR) resistance and nonlinearity resistance, as compared to a Non Return to Zero (NRZ) modulation format heretofore applied to the system of 10 Gb/s or less. Moreover, in addition to the abovementioned modulation format, research and development of a phase modulation format such as Differential Quadrature Phase-Shift Keying (RZ-DQPSK) or CSRZ-DQPSK modulation format having characteristics of high frequency efficiency with narrow spectrum have become active (for example, refer to Japanese Unexamined Patent Publication No. 2003-60580 and Published Japanese translation No. 2004-516743 of PCT International Publication).

FIG. 16 is a block diagram showing a configuration example of a conventional optical transmitter that adopts the 43 Gb/s (CS)RZ-DPSK modulation format to transmit an optical signal. Moreover FIG. 17 is a block diagram showing a configuration example of a conventional optical receiver that performs reception processing such as demodulation with respect to the optical signal transmitted by the optical transmitter in FIG. 16.

The optical transmitter 110 shown in FIG. 16 includes, for example, a transmission data processing circuit 111, a continuous wave (CW) light source 112, a phase modulator 113, and an intensity modulator for RZ pulsing 114.

Specifically, the transmission data processing circuit 111 has a function as a framer that frames input data and a function as a forward error correction (FEC) encoder that applies an error correction code, as well as a function as a DPSK precoder that performs an encoding process, which reflects difference information between a code one bit before and the current code. The phase modulator 113 modulates continuous waves from the CW light source 112 with encoded data from the transmission data processing circuit 111, and outputs an optical signal having constant light intensity, which carries information on a binary optical phase, that is, a DPSK-modulated optical signal. Moreover the intensity modulator for RZ pulsing 114 is for RZ-pulsing the optical signal from the phase modulator 113. In particular, an optical signal RZ-pulsed by using a clock drive signal of the same frequency as the bit rate (43 GHz) and amplitude one times the quenching voltage (Vπ) is referred to as an RZ-DPSK signal. An optical signal RZ-pulsed by using a clock drive signal of a frequency half the bit rate (21.5 GHz) and amplitude two times the quenching voltage (Vπ) is referred to as a CSRZ-DPSK signal. The (CS)RZ-DPSK signal transmitted from the optical transmitter 110 has a 43 GHz clock waveform as the optical intensity, and carries information on the binary optical phase.

Moreover, the optical receiver 120 shown in FIG. 17 is connected to the optical transmitter 110 via a transmission path 101 to receive and process the (CS)RZ-DPSK signal input from the transmission path 101, and includes, for example, a variable dispersion compensator 121, an optical amplifier 122, a delay interferometer 123, a photoelectric conversion circuit 124, a reproducing circuit 125, a received data processing circuit 126, and a control circuit 127. With this optical receiver 120, wavelength dispersion tolerance in 43 Gb/s transmission becomes as strict as about 1/16, as compared to the case of 10 Gb/s transmission. Accordingly, the variable dispersion compensator 121 is arranged at an input end to perform highly accurate wavelength dispersion compensation.

More specifically, the variable dispersion compensator 121 performs wavelength dispersion compensation of the (CS) RZ-DPSK signal transmitted through the transmission path 101. The optical amplifier 122 amplifies the power of the optical signal output from the variable dispersion compensator 121 to a required level in order to compensate light loss in the variable dispersion compensator 121, and outputs the amplified optical signal to the delay interferometer 123. The delay interferometer 123 comprises for example, a Mach-Zehnder interferometer, and makes a delay component of one bit time (in this case, 23.3 ps) of an input signal and a component phase controlled with 0 rad interfere with each other (delay interference), and outputs an interference result as two outputs. In other words, one of branching waveguides constituting the Mach-Zehnder interferometer is formed so as to be longer than the other branching waveguide by a propagating length corresponding to one bit time. The photoelectric conversion circuit 124 comprises a dual-pin photodiode that performs balanced detection by receiving the two outputs from the delay interferometer 123, respectively. The reproducing circuit 125 is for extracting a data signal and a clock signal from the received signal, which has been subjected to balanced detection in the photoelectric conversion circuit 124. The received data processing circuit 126 executes signal processing such as error correction based on the data signal and the clock signal extracted by the reproducing circuit 125. The control circuit 127 monitors the number of occurrences of errors detected at the time of error correction processing in the received data processing circuit 126, and feed-back controls the variable dispersion compensator 121 and the delay interferometer 123 so that the number of occurrences of errors becomes the least.

As the conventional technique associated with the control of the variable dispersion compensator and the like in the optical transmission system applying the optical modulation format such as (CS)RZ-DPSK described above, a technique in which the quality of the received optical signal is monitored without performing the demodulation process of the received optical signal has been proposed in, for example, U.S. Patent Application Publication No. 2004-0223769.

Moreover, a technique in which a variable dispersion compensator and the like provided in a transmission section, a relay or a reception section is feed-back controlled and optimized based on a transmission characteristic measured at a receiving end is disclosed in, for example, Japanese Unexamined Patent Publication No. 8-321805 and Japanese Unexamined Patent Publication No. 2000-115077.

As described above, in the conventional optical receiver, in order to receive and process the optical signal having a super high-speed bit rate as high as for example 40 Gb/s and adopting the (CS)RZ-D(Q)PSK modulation format, not only the phase control amount in the delay interferometer but also the dispersion compensation amount in the variable dispersion compensator need to be optimized and controlled according to the monitored number of occurrences of errors in the demodulated electric signal. However, the characteristic of the wavelength dispersion compensation amount and the characteristic of the phase control amount relative to the number of occurrences of errors in the received signal are different in nature. Therefore, at the time of initial setup, since the control amounts of the variable dispersion compensator and the delay interferometer deviate from the optimum value, the optimum control amount for the both devices needs to be searched. However, the search requires a relatively long time, thereby causing a problem in quickly stabilizing the control amount of the delay interferometer and the variable dispersion compensator.

FIG. 18 shows one example of a situation in which the optimum control amount of the variable dispersion compensator and the delay interferometer in the conventional optical receiver is searched. In this example, the optimum control amount for both devices indicated in a circular area enclosed by the broken line in the figure is searched by alternately adjusting the dispersion compensation amount in the variable dispersion compensator and the optical phase control amount in the delay interferometer. Moreover, FIG. 19 shows one example of a relation between the dispersion compensation amount in the variable dispersion compensator, and the optical phase control amount in the delay interferometer, and the number of occurrences of errors in the received signal. Thus, since an optimum point at which the number of occurrences of errors in the received signal becomes the fewest changes depending on the dispersion compensation amount and the optical phase control amount, respectively, the optimum point for each of the dispersion compensation amount and the optical phase control amount needs to be searched. When each search is performed using the received signal with excellent OSNR at the time of normal operation, then as shown in FIG. 20, a long time is required for counting the number of occurrences of errors corresponding to the required error rate (for example, in the case of a received signal of 40 Gb/s, 25 seconds are required for counting errors of $10^{-12}$ level). An optimum point P' searched in such a state that the errors cannot be counted sufficiently may be different from an original optimum point P.

SUMMARY OF THE INVENTION

In view of the above situation, it is an object of the present invention to provide an optical receiver and a controlling method thereof that can optimize and control the variable dispersion compensator and the delay interferometer in a short period of time based on the error information in the received signal, and an optical transmission system.

To achieve the above object, the present invention provides an optical receiver comprising: a variable dispersion compensating section that compensates wavelength dispersion of an input optical signal of a differential M-phase modulation format, where M=2n when n is a natural number; a delay interfering section that performs delay interference processing in which a one-bit delayed branched component and an optically phase-controlled branched component, of the optical signal dispersion-compensated by the variable dispersion compensating section, are made to interfere with each other; a photoelectric converting section that performs photoelectric conversion detection with respect to an optical signal from the delay interfering section, to thereby output a demodulated electric signal corresponding to the differential M-phase modulation format; an error monitor section that monitors information relating to an error rate of the electric signal output from the photoelectric converting section; and a control section that controls a dispersion compensation amount in the variable dispersion compensating section and an optical phase control amount in the delay interfering section. The optical receiver further comprises a signal quality adjusting section that enables adjustment of a signal-to-noise ratio of the optical signal input to the photoelectric converting section, and the control section controls the signal quality adjusting section to deteriorate the signal-to-noise ratio of the optical signal input to the photoelectric converting section, to thereby realize a state in which the information monitored by the error monitor section corresponds to a preset target error rate, and then starts control of the variable dispersion compensating section and the delay interfering section.

In the optical receiver having such a configuration, when the control section optimizes the dispersion compensation amount in the variable dispersion compensating section and the optical phase control amount in the delay interfering section, the control section controls the signal quality adjusting section to deteriorate the signal-to-noise ratio of the optical signal input to the photoelectric converting section, to thereby realize a state in which an error occurs more easily than at the time of normal operation. By starting optimization of the dispersion compensation amount and the optical phase control amount in such a state, error monitoring time in the error monitor can be reduced. The dispersion compensation amount and the optical phase control amount to be optimized are parameters depending on the characteristics of a transmission path connected to the optical receiver. Respective optimum values do not change even if the signal-to-noise ratio of the optical signal input to the photoelectric converting section inside the optical receiver is deteriorated, and hence, optimization control of the dispersion compensation amount and the optical phase control amount can be reliably performed within a short period of time.

According to the optical receiver of the present invention, optimization control of the dispersion compensation amount and the optical phase control amount can be performed within a short period of time, while efficiently monitoring many errors, thereby enabling a reduction in the time required for optimization of each device efficiently.

Other objects, features and advantages of the present invention will become apparent from the following description of embodiments, in association with the appended drawings.

DETAILED DESCRIPTION OF THE INVENTION

Hereunder is a description of a best mode for carrying out the present invention, with reference to the appended drawings. The same reference symbols denote the same or equivalent parts throughout all of the drawings.

Figure 1:
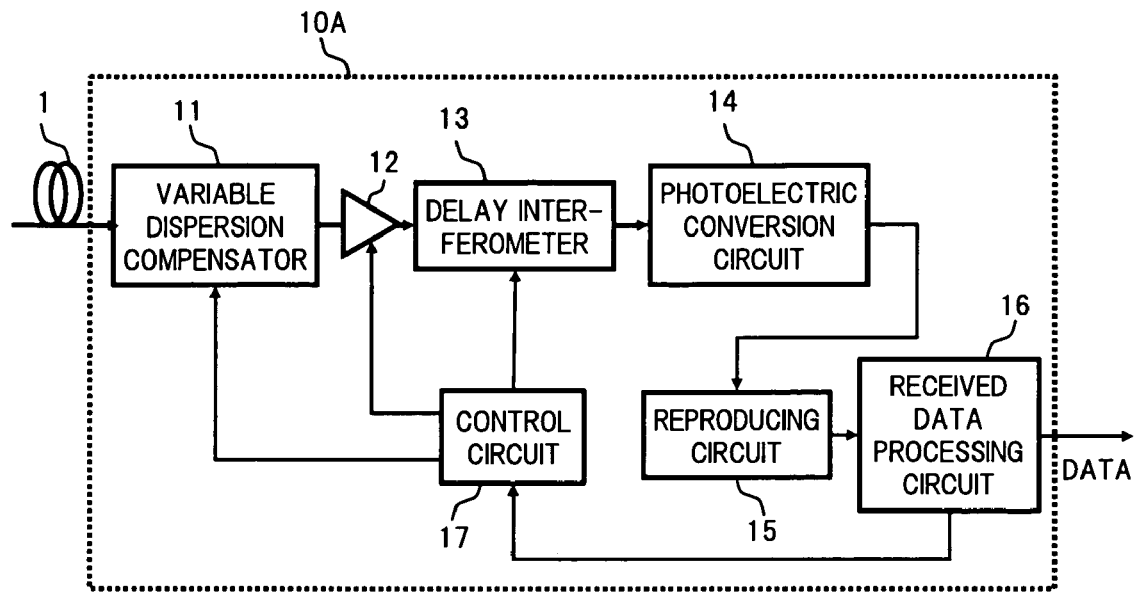
FIG. 1 is a block diagram showing the configuration of an optical receiver according to a first embodiment of the present invention.

FIG. 1 is a block diagram showing the configuration of an optical receiver according to a first embodiment of the present invention.

In FIG. 1, an optical receiver 10A of the first embodiment includes, for example, a variable dispersion compensator 11 serving as a variable dispersion compensating section, an optical amplifier 12 serving as an optical amplifying section, a delay interferometer 13 serving as a delay interfering section, a photoelectric conversion circuit 14 serving as a photoelectric converting section, a reproducing circuit 15 serving as a reproducing section, a received data processing circuit 16 serving as an error correcting section, and a control circuit 17 serving as a controller. When compared with the configuration of the conventional optical receiver shown in FIG. 17, the optical receiver 10A is different in that control of the optical amplifier 12 by the control circuit 17 is added.

The variable dispersion compensator 11 is a known optical device that receives an optical signal transmitted from the optical transmitter (not shown) through a transmission path 1, and compensates wavelength dispersion accumulated in the optical signal, and the dispersion compensation amount thereof is variably controlled by the control circuit 17. The optical signal input to the variable dispersion compensator 11 from the transmission path 1 is an optical signal that has been subjected to differential M-phase modulation, where M=2n when n is a natural number. Moreover, the optical signal may be pulsed and subjected to intensity modulation in addition to the differential M-phase modulation. Specifically, for example, an optical signal of a DPSK or (CS)RZ-DPSK modulation format corresponding to M=2, or a DQPSK or (CS)RZ-DQPSK modulation format corresponding to M=4 is input to the variable dispersion compensator 11.

The optical amplifier 12 receives the optical signal output from the variable dispersion compensator 11, compensates an optical loss in the variable dispersion compensator 11 by amplifying the input optical signal in the normal operation, and outputs the amplified optical signal to the delay interferometer 13. Furthermore, at the time of startup or the like of the apparatus, the output level (amplified gain) thereof is adjusted by the control circuit 17 so that the number of occurrences of errors detected by the received data processing circuit 16 in a subsequent stage becomes a value corresponding to a preset target error rate. Here, the optical amplifier 12 also has a function as a signal quality adjusting section.

The delay interferometer 13 comprises for example, a Mach-Zehnder interferometer. It branches an optical signal input from the optical amplifier 12, delays one of the branched optical signals by one bit and provides a phase of an optical phase control amount $\Delta\phi$ to the other optical signal, so that a one-bit delayed optical component interferes with an optical component phase-shifted by the optical phase control amount $\Delta\phi$. For reception of the normal optical signal, the optical phase control amount needs to be set to an optimum value.

The photoelectric conversion circuit 14 performs balanced detection by receiving the optical signal output from the delay interferometer 13 by means of a dual-pin photodiode. Moreover, the reproducing circuit 15 extracts a data signal and a clock signal from the received signal, which has been subjected to balanced detection in the photoelectric conversion circuit 14. Furthermore, the received data processing circuit 16 executes signal processing such as error correction based on the data signal and the clock signal extracted by the reproducing circuit 15, and outputs the received data DATA as well as the number of occurrences of errors detected at the time of error correction processing as information relating to error rate, to the control circuit 17.

When optimizing the dispersion compensation amount in the variable dispersion compensator 11 and the optical phase control amount in the delay interferometer 13 at the time of startup of the apparatus or the like, the control circuit 17 reduces the output level of the optical amplifier 12 so that here the information (the number of occurrences of errors) from the received data processing circuit 16 corresponds to the preset target error rate, to deteriorate the OSNR of the optical signal input to the photoelectric conversion circuit 14, thereby realizing a state in which an error tends to occur. After this, the control circuit 17 starts optimization control of the variable dispersion compensator 11 and the delay interferometer 13.

Here an example of a specific control by the abovementioned control circuit 17 will be described in detail with reference to the flowcharts in FIG. 2 and FIG. 3.

Figure 2:
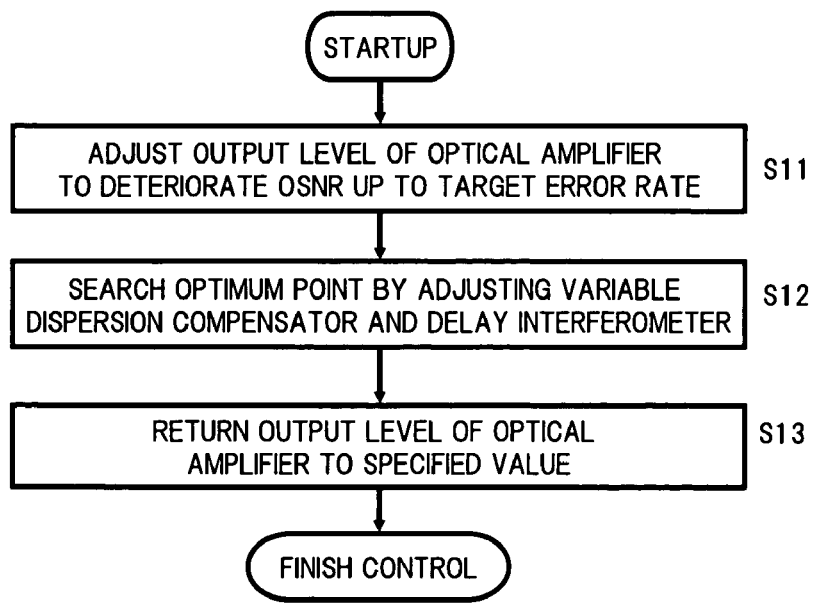
FIG. 2 is a flowchart showing one example of a specific controlling method in the first embodiment.

In the optical receiver 10A having the abovementioned configuration, first at the time of startup of the apparatus by turning the power on, in step 11 in FIG. 2 (shown by S11 in the figure, and denoted similarly hereunder), an amplification gain of the optical amplifier 12 is adjusted by the control circuit 17 so that the output level of the optical amplifier 12 becomes lower than the level at the time of normal operation. Specifically, for example, in such a case that, when the output level of the optical amplifier 12 is −20 dBm in a state where the OSNR of the optical signal input to the optical receiver 10A is sufficiently high, the error rate of the received signal becomes $1\times10^{-8}$ (1E-8), and when the output level of the optical amplifier 12 is −15 dBm, the error rate of the received signal becomes $1\times10^{-12}$ (1E-12), there will be errors 10000 times larger by decreasing the output level of the optical amplifier 12 to −20 dBm, which is set to −15 dBm at the time of normal operation. Assuming a case of 40 Gb/s optical signal, one error will occur in 2.5 ms (milliseconds) due to the decrease in the output level of the optical amplifier 12, while one error occurs in 25 s (seconds) at the time of the normal operation, thereby increasing the number of occurrences of errors countable in a certain period of time. In other words, if the monitoring time of the received signal at the time of counting the number of occurrences of errors is changed from 100 ms to 50 ms, the time required for monitoring the errors can be simply reduced to 1/5000 during the optimization control of the variable dispersion compensator 11 and the delay interferometer 13. In this setting example, the control circuit 17 controls the output level of the optical amplifier 12 to be about −20 dBm so that the number of occurrences of errors detected by the received data processing circuit 16 takes a value corresponding to $1\times10^{-8}$, which is the target error rate.

Next in step 12, the control circuit 17 sequentially executes coarse adjustment and fine adjustment of the dispersion compensation amount in the variable dispersion compensator 11 and the optical phase control amount in the delay interferometer 13 while monitoring occurrences of errors. FIG. 3 is a flowchart showing one example of a specific control in step 12.

Figure 3:
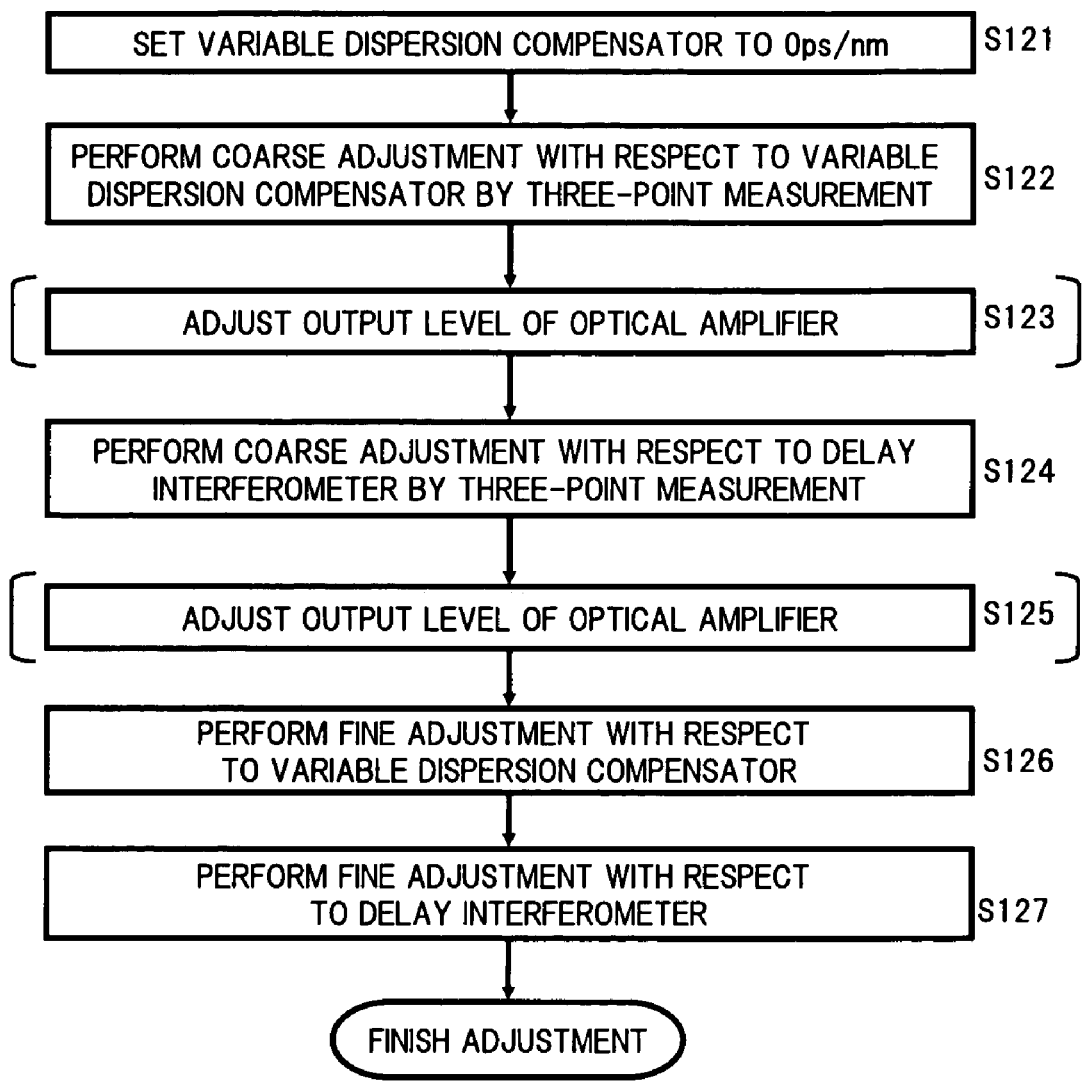
FIG. 3 is a flowchart showing one example of a specific adjusting method of a variable dispersion compensator and a delay interferometer in the first embodiment.

In step 121 in FIG. 3, the dispersion compensation amount in the variable dispersion compensator 11 is set to 0 ps/nm. Then in step 122, coarse adjustment of the variable dispersion compensator 11 is started. In the coarse adjustment, for example, at first the dispersion compensation amount in the variable dispersion compensator 11 is set to three points of 0 ps/nm and ±400 ps/nm, and the dispersion compensation amount with the smallest number of occurrences of errors, which is determined by comparing the number of occurrences of errors at each point, is set to a central point for the next measurement. This time, three points are set by assigning a dispersion compensation amount, ±200 ps/nm, which is half the amount for the previous measurement. The number of occurrences of errors at each point is compared to determine the dispersion compensation amount with the smallest number of occurrences of errors, which is then set to the central point for the next measurement. Similarly hereunder, the number of occurrences of errors at three points determined by assigning a dispersion compensation amount, ±100 ps/nm, which is half the amount for the previous measurement, is compared, and finally the number of occurrences of errors at three points determined by assigning a dispersion compensation amount, ±50 ps/nm, which is half the amount thereof, is compared, to thereby set the dispersion compensation amount with the smallest number of occurrences of errors to an optimum point in the coarse adjustment.

Next in step 123, when the error rate is improved relatively larger than for the target value (here $1\times10^{-8}$) due to the coarse adjustment of the variable dispersion compensator 11 so that an error hardly occurs, the output level of the optical amplifier 12 is readjusted so that the error rate approaches the target value. The coarse adjustment of the delay interferometer 13 in the next step 124 can be performed within a short period of time due to the readjustment of the output level of the optical amplifier 12. It is also possible to omit this step 123 and proceed to the next step 124.

In step 124, the coarse adjustment of the delay interferometer 13 is started. In the coarse adjustment, at first the optical phase control amount in the delay interferometer 13 is set to three points, that is, an initial value and two points at the initial value ±π, and the optical phase control amount with the smallest number of occurrences of errors, which is determined by comparing the number of occurrences of errors at each point, is set to a central point for the next measurement, as in the aforementioned coarse adjustment of the variable dispersion compensator 11. Next the number of occurrences of errors at three points, which are determined by assigning the optical phase control amount of ±π/2, is compared to determine the optical phase control amount with the smallest number of occurrences of errors, which is then set to the central point for the next measurement. Lastly, the number of occurrences of errors at three points, which are determined by assigning the optical phase control amount of ±π/4, is compared to determine the optical phase control amount with the smallest number of occurrences of errors, which is set to the optimum point in the coarse adjustment.

Next in step 125, when the error rate is improved relatively larger than for the target value due to the coarse adjustment of the delay interferometer 13, as in the aforementioned step 123, so that an error hardly occurs, the output level of the optical amplifier 12 is readjusted again so that the error rate approaches the target value. Due to the re-readjustment of the output level of the optical amplifier 12, the fine adjustment of the variable dispersion compensator 11 and the delay interferometer 13 in the next steps 126 and 127 can be performed within a short period of time. It is also possible to omit this step 125 and proceed to the next step 126.

In step 126, fine adjustment of the variable dispersion compensator 11 is started. In the fine adjustment, the dispersion compensation amount is adjusted up to the point where the number of occurrences of errors becomes the smallest, by assigning a dispersion compensation amount by 5 ps/nm from the optimum point set by the coarse adjustment in step 122.

In step 127, fine adjustment of the delay interferometer 13 is started. In the fine adjustment, the optical phase control amount is adjusted up to the point where the number of occurrences of errors becomes the smallest, by assigning the optical phase control amount by several degrees from the optimum point set by the coarse adjustment in step 124. When the fine adjustment of the delay interferometer 13 is complete, control returns to step 13 in FIG. 2.

In step 13, the amplification gain of the optical amplifier 12 is adjusted by the control circuit 17 so that the output level of the optical amplifier 12 returns to a specified value (−15 dBm in the abovementioned example) at the time of normal operation. Accordingly, the optimization control of the variable dispersion compensator 11 and the delay interferometer 13 at the time of startup of the apparatus finishes.

According to the abovementioned optical receiver 10A in the first embodiment, the output level of the optical amplifier 12 is adjusted at the time of startup so that many errors can be efficiently monitored within a short period of time, thereby enabling reduction of the time required for optimizing the variable dispersion compensator 11 and the delay interferometer 13. For example, while about 10 minutes have been heretofore required for optimization of the dispersion compensation amount and the optical phase control amount at the time of startup, the time can be reduced to about 5 minutes by reducing the sampling time according to the present invention. Moreover, in the optical receiver that receives and processes the super high-speed optical signal of the differential M-phase modulation format, the variable dispersion compensator and the optical amplifier are structurally essential devices, and using the optical amplifier gives an advantage in that the time for optimization control can be reduced without further adding an expensive device.

Moreover, since the number of occurrences of errors detected at the time of error correction processing in the received data processing circuit 16 is transmitted to the controller, there is also the effect that the time for optimization control of the variable dispersion compensator 11 and the delay interferometer 13 can be reduced without substantially affecting the reception process of a main signal.

Figure 20:
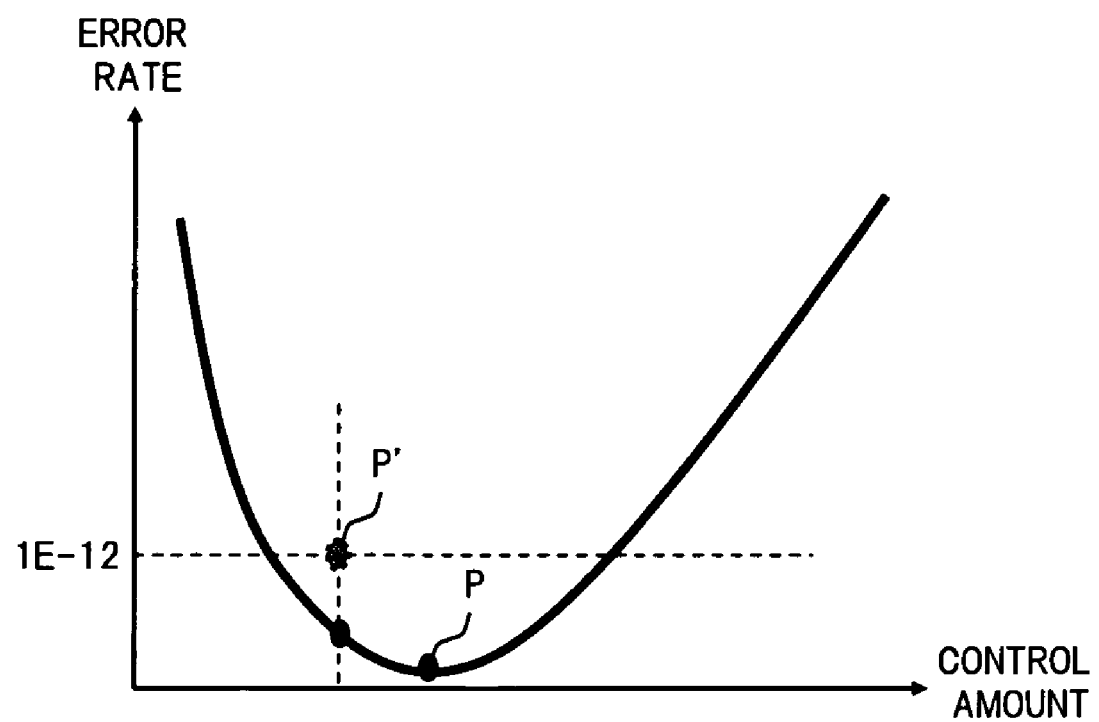
FIG. 20 is a diagram for explaining a problem in the optimization control in the conventional optical receiver.

Briefly explaining the above effect, the received data processing circuit 16 can correct 6- to 8-digit errors using the well-known error correction technology. As explained with reference to FIG. 20, when the OSNR of the received optical signal is relatively good, the optical signal can be normally received and processed even if the dispersion compensation amount and the optical phase control amount are not necessarily adjusted to the optimum value (see P' in FIG. 20), and if there is a change in the OSNR, a reception error may occur because the dispersion compensation amount and the optical phase control amount have not been optimized.

Therefore, adjustment to the optimum point is possible without affecting reception processing of the main signal by adjusting the output level of the optical amplifier 12 to increase errors, while confirming that the number of occurrences of errors detected at the time of error correction processing in the received data processing circuit 16 is within a range of error correcting capability. For example, when the error rate of the received signal which can be error corrected by the received data processing circuit 16 is $10^{-8}$, if a number of occurrences of errors, which may exceed the error correcting capability of the received data processing circuit 16, is confirmed while adjusting the variable dispersion compensator 11 and the delay interferometer 13 in step 12 in FIG. 2, the output level of the optical amplifier 12 is adjusted to suppress the occurrence of errors, thereby enabling to continue optimization of the variable dispersion compensator 11 and the delay interferometer 13 as is.

In the case of the control flow shown in FIG. 3, the number of occurrences of errors may increase by about one digit due to a deviation of the set point, at the time of performing the coarse adjustment of the variable dispersion compensator 11 and the delay interferometer 13. Therefore, it is desirable to ensure a margin of one digit or more with respect to the error correcting capability of the received data processing circuit 16. In this case, at the timing when the coarse adjustment is complete and the fine adjustment is started (step 125), the upper limit of the number of occurrences of errors to be monitored can be changed, for example, from 4000/s (number of errors occurring in one second with error rate of $10^{-7}$) at the time of coarse adjustment to 40000/s (number of errors occurring in one second with error rate of $10^{-8}$) at the time of fine adjustment. Furthermore, as another method other than the control flow in FIG. 3, when only the fine adjustment of the variable dispersion compensator 11 and the delay interferometer 13 is performed, the OSNR can be deteriorated up to the full error correcting capability of the received data processing circuit 16, thereby enabling to effectively shorten the time period. Thus, the adjustment of the optical amplifier 12 taking the error correcting capability into consideration is particularly effective to shorten the time period in the optimization control for a relatively narrow range.

Figure 4:
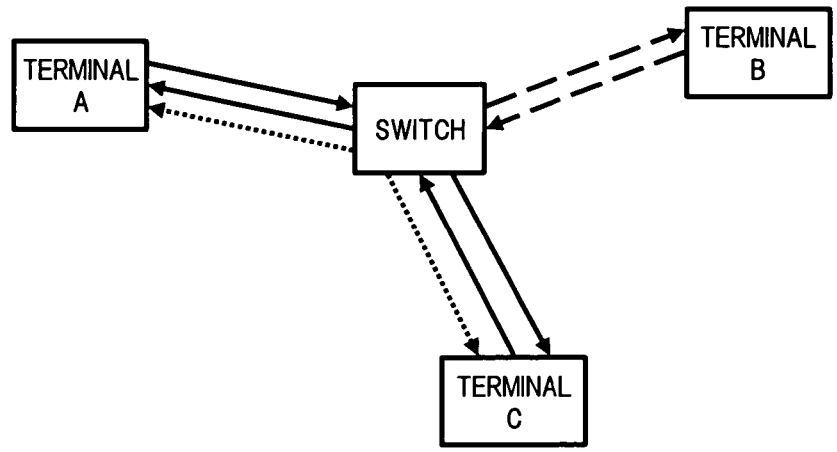
FIG. 4 is a diagram showing a configuration example of a network associated with the first embodiment.
Figure 5:
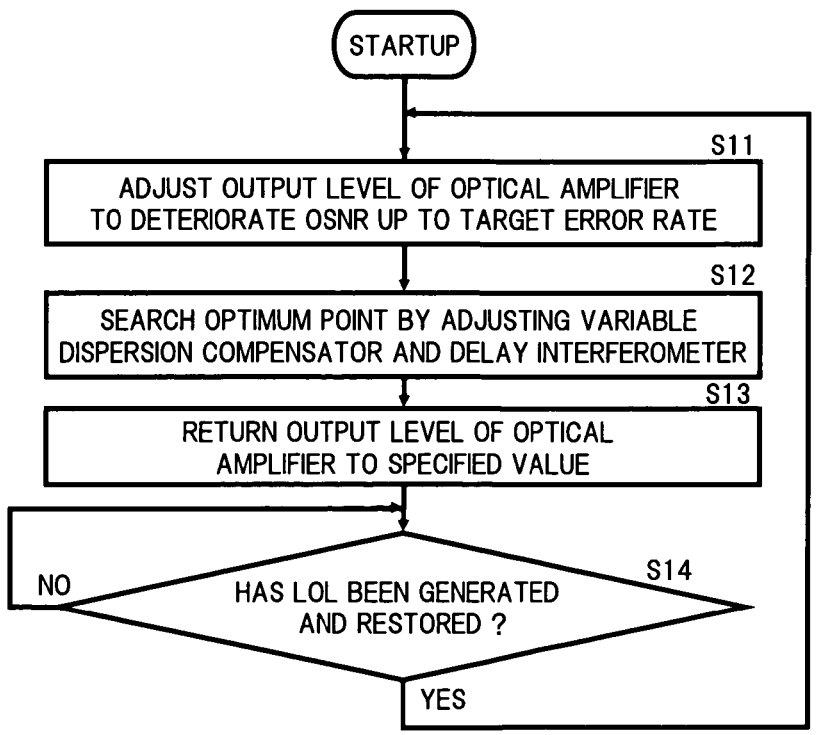
FIG. 5 is a flowchart showing one example of another controlling method corresponding to the network configuration in FIG. 4.

In the abovementioned first embodiment, a case in which the optimization control of the variable dispersion compensator 11 and the delay interferometer 13 is executed at the time of startup of the apparatus has been explained. However, the timing when the optimization control is executed is not limited to the startup timing. For example, in a network having a configuration as shown in FIG. 4 where paths connecting a plurality of terminals A, B and C are changed over by a switch, conditions such as the fiber length of the transmission path, the temperature, and the humidity change due to the switchover of the paths, and hence the set point of the variable dispersion compensator 11 and the delay interferometer 13 at the receiving end need to be readjusted. Therefore, for example generation and restoration of Loss Of Light (LOL) information generated at the timing when the paths are changed over (which means disconnection of the optical signal to the optical receiver and restoration thereof may be monitored, which can be used as a trigger for readjustment of the variable dispersion compensator and the delay interferometer to automatically decrease the output level of the optical amplifier 12, to thereby re-optimize the dispersion compensation amount and the optical phase control amount. By providing such a function to the optical receiver, setting of the optical receiver can be automatically optimized by merely switching the switch at the time of changing over the paths. FIG. 5 shows one example of a flowchart in this case corresponding to that of FIG. 2, wherein after control at the time of startup is complete in steps 11 to 13, determination of generation and restoration of LOL is performed in step 14, and when the determination result is YES, control returns to step 11 to start readjustment.

A second embodiment of the present invention will be described next.

In the abovementioned first embodiment, the OSNR of the optical signal input to the photoelectric conversion circuit 14 is deteriorated by adjusting the output level of the optical amplifier 12. However, an auto level controller (ALC) that keeps the output level constant or an auto gain controller (AGC) that keeps the gain constant is commonly applied to the control of the optical amplifier in the known optical receiver. During the operation, external control of the ALC or AGC in the optical amplifier may be difficult. Therefore in the second embodiment and thereafter, modified examples will be described, in which the same action and effect as those of the first embodiment can be obtained by a method other than adjustment of the output level of the optical amplifier.

Figure 6:
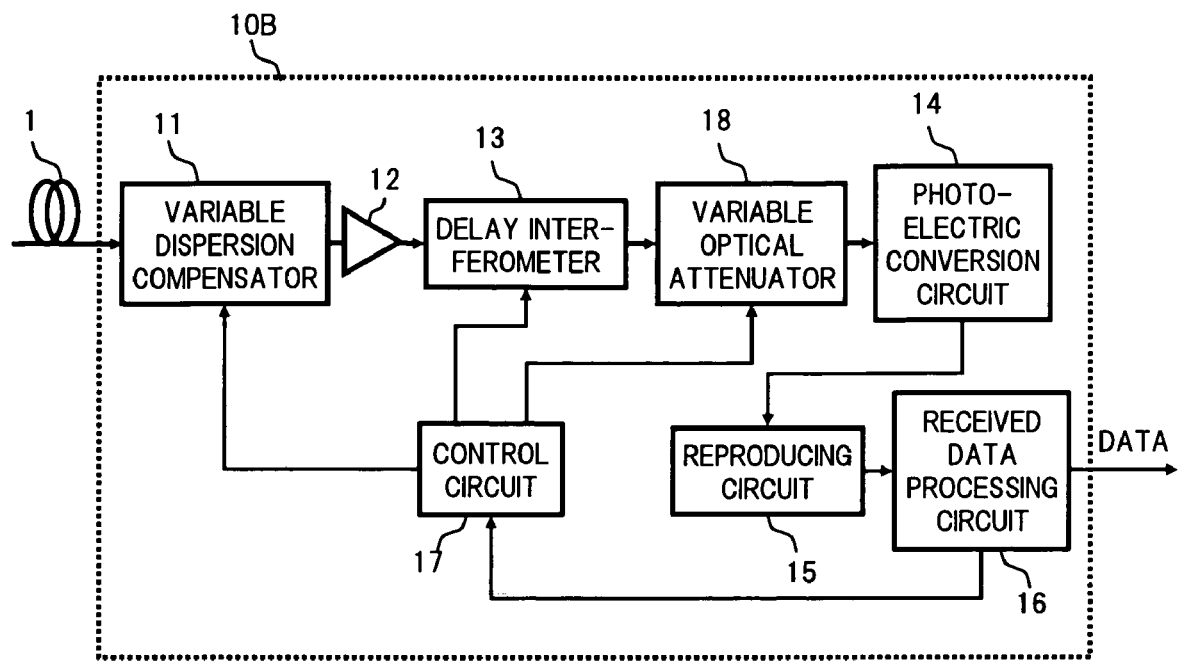
FIG. 6 is a block diagram showing the configuration of an optical receiver according to a second embodiment.

FIG. 6 is a block diagram showing the configuration of an optical receiver according to the second embodiment of the present invention.

In FIG. 6, an optical receiver 10B of the second embodiment is different from the configuration in the first embodiment shown in FIG. 1 in that, for example, a variable optical attenuator 18 is added on an optical path between the delay interferometer 13 and the photoelectric conversion circuit 14, and the attenuation of the variable optical attenuator 18 is adjusted by the control circuit 17, instead of adjusting the output level (amplification gain) of the optical amplifier 12 at the time of startup of the apparatus. The attenuation of the variable optical attenuator 18 can be controlled relatively easily by voltage or current from outside. Regarding the control of the optical amplifier 12, it is assumed here that the output level is kept constant by the ALC (not shown). Since the configuration of the optical receiver 10B other than the aforementioned configuration is the same as that of the first embodiment, explanation thereof is omitted here.

Figure 7:
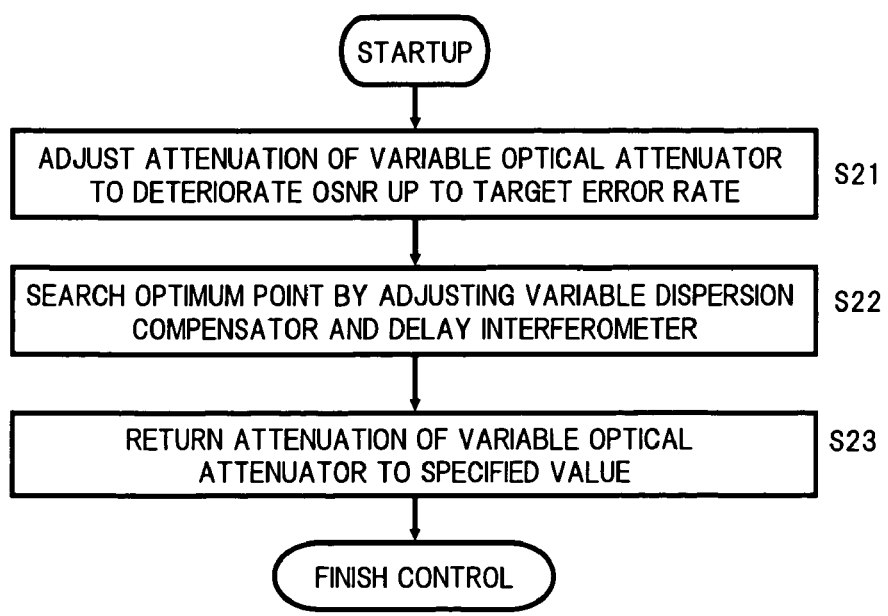
FIG. 7 is a flowchart showing one example of a specific controlling method in the second embodiment.

FIG. 7 is a flowchart showing an example of specific control by the control circuit 17 in the abovementioned optical receiver 10B. Basically, the control flow thereof is the same as that of the abovementioned first embodiment shown in FIG. 2, and the attenuation of the variable optical attenuator 18 is increased, instead of reducing the output level of the optical amplifier 12, to thereby deteriorate the OSNR of the optical signal. Moreover the abovementioned specific control method shown in FIG. 3 can also be applied to optimization of the variable dispersion compensator 11 and the delay interferometer 13 in step S22 in FIG. 7. Furthermore the abovementioned control flow corresponding to optimization adjustment at the time of switching the path shown in FIG. 5 can of course be applied.

According to the optical receiver 10B in the abovementioned second embodiment, even when it is difficult to control the optical amplifier 12 from outside during the operation, the attenuation of the variable optical attenuator 18 is increased based on the target value of the error rate so as to enable efficient monitoring of many errors within a short period of time. Accordingly, the time required for optimization of the variable dispersion compensator 11 and the delay interferometer 13 can be reduced.

In the abovementioned second embodiment, a configuration example is shown in which the variable optical attenuator 18 is arranged between the delay interferometer 13 and the photoelectric conversion circuit 14. However the variable optical attenuator 18 may be provided between the optical amplifier 12 and the delay interferometer 13.

A third embodiment of the present invention will be described next.

Figure 8:
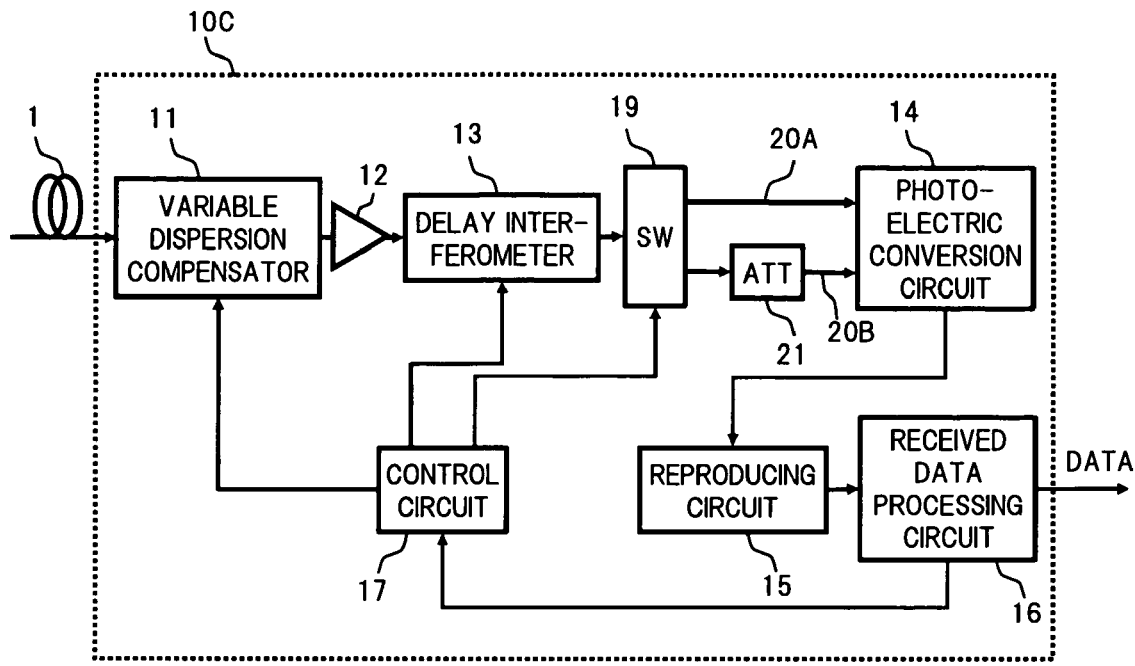
FIG. 8 is a block diagram showing the configuration of an optical receiver according to a third embodiment.

FIG. 8 is a block diagram showing the configuration of an optical receiver according to the third embodiment of the present invention.

In FIG. 8, an optical receiver 10C of the third embodiment further includes, for example, in addition to the abovementioned configuration of the first embodiment shown in FIG. 1, an optical switch (SW) 19 to which the optical signal output from the delay interferometer 13 is input, a first optical path 20A that connects between one of two output ports of the optical switch 19 and a photoelectric conversion circuit 14, a second optical path 20B that connects between the other output port of the optical switch 19 and the photoelectric conversion circuit 14, and a fixed optical attenuator (ATT) 21 arranged on the second optical path 20B. Since the configuration of the optical receiver 10C other than the above is the same as that of the first embodiment, explanation thereof is omitted here.

The optical switch 19 is controlled by the control circuit 17, and is switched so that the optical signal from the delay interferometer 13 is transmitted to the second optical path 20B side when optimization control of the variable dispersion compensator 11 and the delay interferometer 13 is performed at the time of startup of the apparatus. The fixed optical attenuator 21 has a fixed attenuation corresponding to the target error rate at the time of optimization control. Regarding the control of the optical amplifier 12, it is assumed here that the output level is kept constant by an ALC (not shown). As an example of the attenuation of the fixed optical attenuator 21, when the target error rate is about $10^{-8}$, if the optical signal power required as an input to the optical receiver 10C is −20 dBm, and the output level of the optical amplifier 12 is −8 dBm, the attenuation of the fixed optical attenuator 21 can be determined as 12 dB. Actually, however, a loss in the delay interferometer 13 and the optical switch 19 SW needs to be included.

Figure 9:
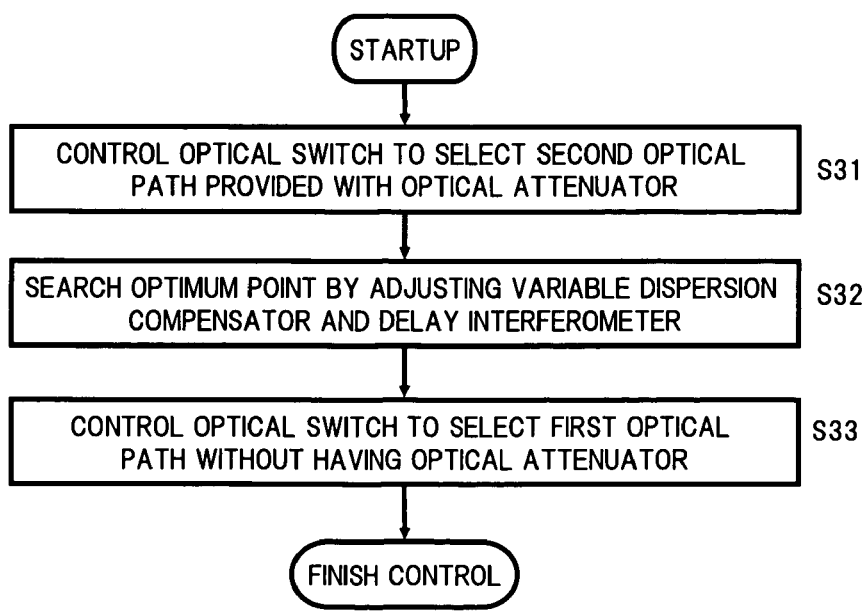
FIG. 9 is a flowchart showing one example of a specific controlling method in the third embodiment.

FIG. 9 is a flowchart showing an example of specific control by the control circuit 17 in the abovementioned optical receiver 10C. At the time of startup of the optical receiver 10C, in step S31 in FIG. 9, the optical switch 19 is controlled by the control circuit 17, and the second optical path 20B provided with the fixed optical attenuator 21 is selected. Accordingly, the optical signal output from the delay interferometer 13 is input to the photoelectric conversion circuit 14 after being attenuated by the fixed optical attenuator 21. Accordingly, the OSNR is deteriorated so that an error tends to occur. Then in step 32, optimization of the variable dispersion compensator 11 and the delay interferometer 13 is executed by the control circuit 17 in basically the same manner as in the first embodiment. When optimization of the variable dispersion compensator 11 and the delay interferometer 13 has finished, in step 33, the optical switch 19 is controlled by the control circuit 17 to switch to the first optical path 20A, which is not provided with the fixed optical attenuator 21.

According to the abovementioned optical receiver 10C of the third embodiment, even when it is difficult to control the optical amplifier 12 from outside during the operation, the optical switch 19 is switched at the time of optimization control of the variable dispersion compensator 11 and the delay interferometer 13, thereby enabling to efficiently monitor many errors within a short period of time. Accordingly, the time required for optimization can be reduced. However, since the fixed optical attenuator 21 is used in the third embodiment, the signal level cannot be adjusted according to the variation of the error rate in the middle of coarse adjustment or fine adjustment of the variable dispersion compensator 11 and the delay interferometer 13, as in the first and the second embodiments, but the apparatus can be constructed at a low cost.

In the abovementioned third embodiment, a configuration example in which the optical switch 19 and the fixed optical attenuator 21 are arranged between the delay interferometer 13 and the photoelectric conversion circuit 14 has been shown. However the optical switch 19 and the fixed optical attenuator 21 may be provided between the optical amplifier 12 and the delay interferometer 13. Moreover the control flow corresponding to optimization adjustment at the time of switching the path as shown in FIG. 5 can also be applied to the third embodiment.

A fourth embodiment of the present invention will be described next.

Figure 10:
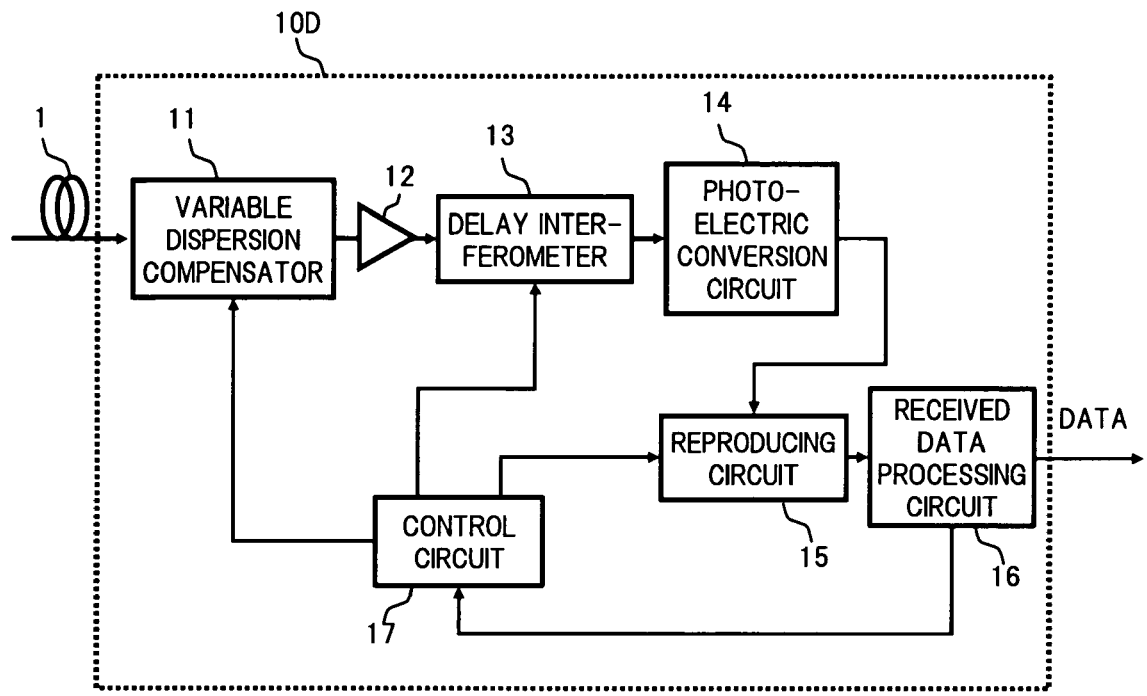
FIG. 10 is a block diagram showing the configuration of an optical receiver according to a fourth embodiment.

FIG. 10 is a block diagram showing the configuration of an optical receiver according to the fourth embodiment of the present invention.

In FIG. 10, the configuration of an optical receiver 10D of the fourth embodiment is different from the abovementioned case of the first embodiment shown in FIG. 1 in that a threshold level for 0-1 determination in the reproducing circuit 15 is adjusted, instead of adjusting the output level (amplification gain) of the optical amplifier 12 based on the target value of the error rate. Since the configuration of the optical receiver 10D other than above is the same as that of the first embodiment, explanation thereof is omitted here.

Figure 11:
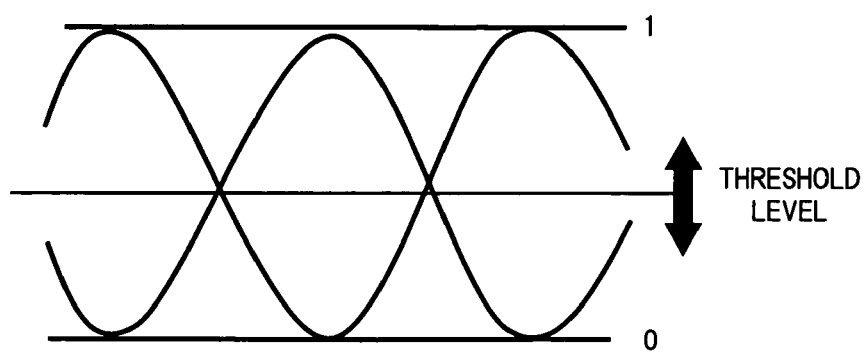
FIG. 11 is a diagram for explaining a threshold level in a reproducing circuit in the fourth embodiment.

The threshold level for 0-1 determination in the reproducing circuit 15 is, for example, as shown in FIG. 11, normally optimized so that "0" level and "1" level of a signal waveform can be best determined. However the number of occurrences of errors for reproduced data can be increased by intentionally shifting the threshold level.

Figure 12:
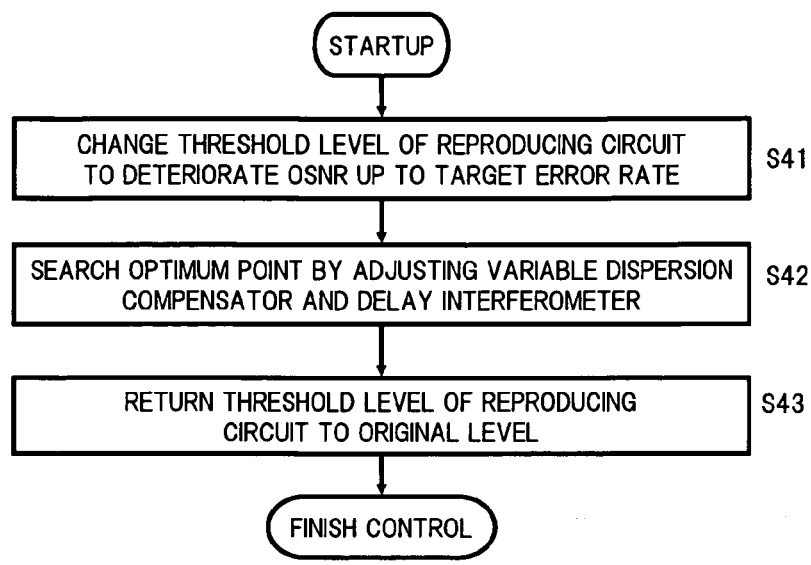
FIG. 12 is a flowchart showing one example of a specific controlling method in the fourth embodiment.

FIG. 12 is a flowchart showing an example of specific control by the control circuit 17 in the abovementioned optical receiver 10D. At the time of startup of the optical receiver 10D, in step 41 in FIG. 12, since the threshold level of the reproducing circuit 15 is shifted by the control circuit 17 according to the target error rate, an error tends to occur. Specifically, since the threshold level of the reproducing circuit 15 is given by the voltage, the voltage value may be shifted up or down. For example, when the optimum value of the normal threshold level is 1.7V, by shifting the threshold level to 1.3V while monitoring the number of occurrences of errors at the time of startup, about $10^3$ errors occur. Then in step 42, optimization of the variable dispersion compensator 11 and the delay interferometer 13 is executed by the control circuit 17 as in the first embodiment. When optimization of the variable dispersion compensator 11 and the delay interferometer 13 has finished, in step 43, the threshold level of the reproducing circuit 15 is returned to the normal voltage value (in the above example, 1.7V) by the control circuit 17.

According to the abovementioned optical receiver 10D of the fourth embodiment, even when it is difficult to control the optical amplifier 12 from outside during the operation, the threshold level of the reproducing circuit 15 is shifted based on the target value of the error rate, so as to enable efficient monitoring of many errors within a short period of time. Accordingly, the time required for optimization of the variable dispersion compensator 11 and the delay interferometer 13 can be reduced.

The abovementioned control flow corresponding to optimization adjustment at the time of switching the path shown in FIG. 5 can also be applied to the abovementioned fourth embodiment.

A fifth embodiment of the present invention will be described next.

In the abovementioned first to fourth embodiments, the components inside the optical receiver are controlled at the time of startup and the like, to deteriorate the OSNR of the received signal so as to realize a situation in which an error tends to occur. However, such a situation in which an error tends to occur can be also realized by controlling an apparatus other than the optical receiver on an optical transmission system. Therefore in the fifth embodiment, an application example will be described, in which a transmission output level in the optical transmitter on the optical transmission system is adjusted.

Figure 13:
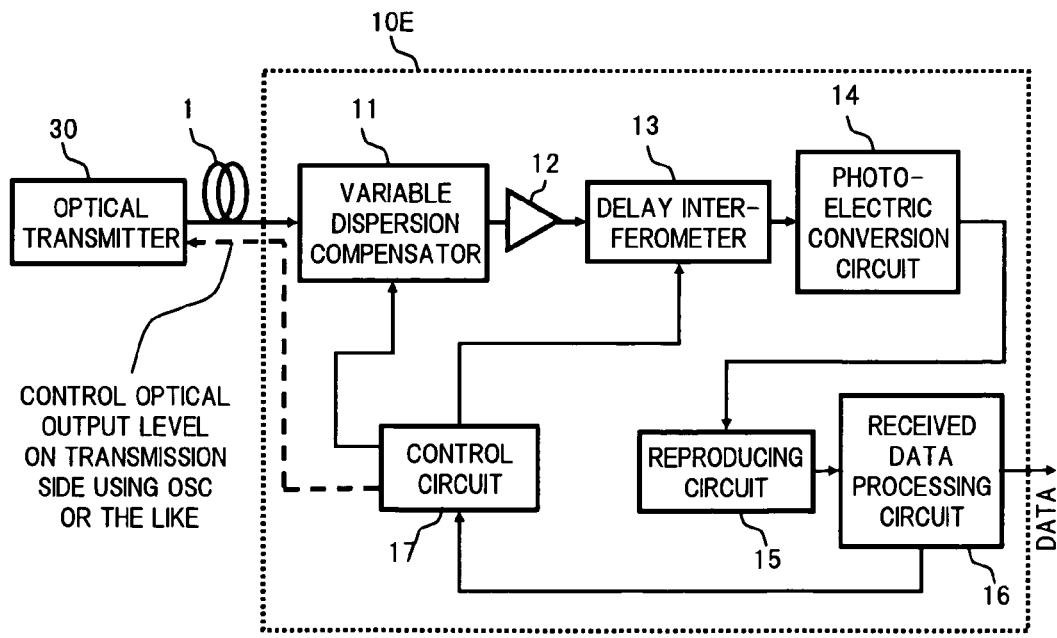
FIG. 13 is a block diagram showing the configuration of an optical transmission system according to a fifth embodiment of the present invention.

FIG. 13 is a block diagram showing the configuration of an optical transmission system according to the fifth embodiment of the present invention.

In FIG. 13, the optical transmission system of the fifth embodiment includes, an optical transmitter 30 that transmits an optical signal of the differential M-phase modulation format to a transmission line 1, and an optical receiver 10E that receives and processes the optical signal propagating on the transmission line 1. Here an optical repeater (not shown) or the like may be arranged on the transmission line 1. The optical transmission system is characterized in that the OSNR of the optical signal received by the optical receiver 10E is deteriorated to realize the situation in which an error tends to occur, by using an optical supervisory channel (OSC) signal for system supervising transmitted using an opposite line (not shown) to transmit control information for decreasing the optical output level of the optical transmitter 30, from the optical receiver 10E to the optical transmitter 30 when optimization control of the variable dispersion compensator 11 and the delay interferometer 13 is performed at the time of startup, in the optical receiver 10E.

Figure 17:
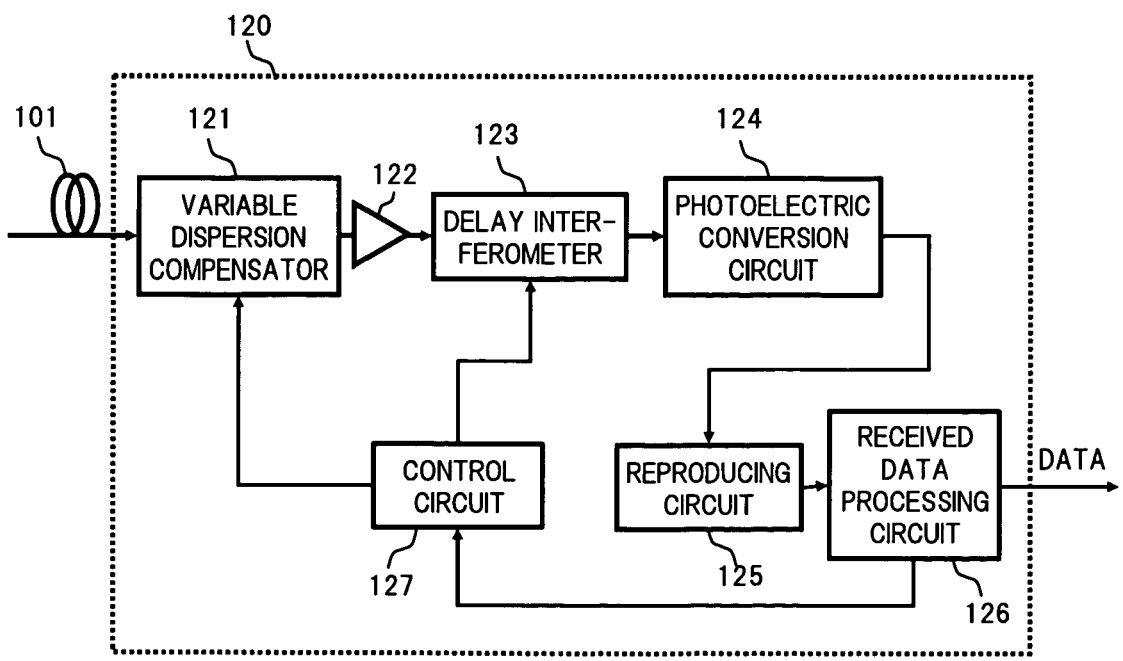
FIG. 17 is a block diagram showing a configuration example of a conventional optical receiver.
Figure 18:
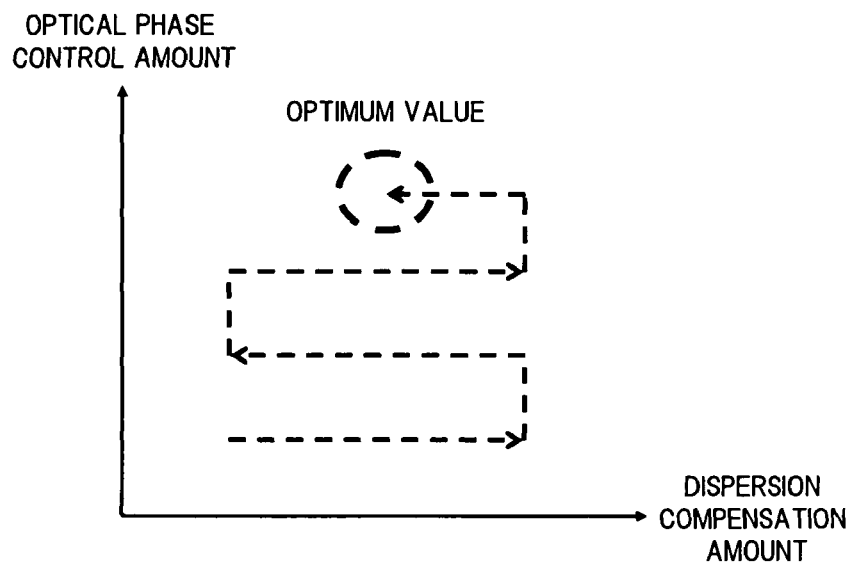
FIG. 18 is a diagram showing one example of optimization control of a variable dispersion compensator and a delay interferometer in the conventional optical receiver.
Figure 19:
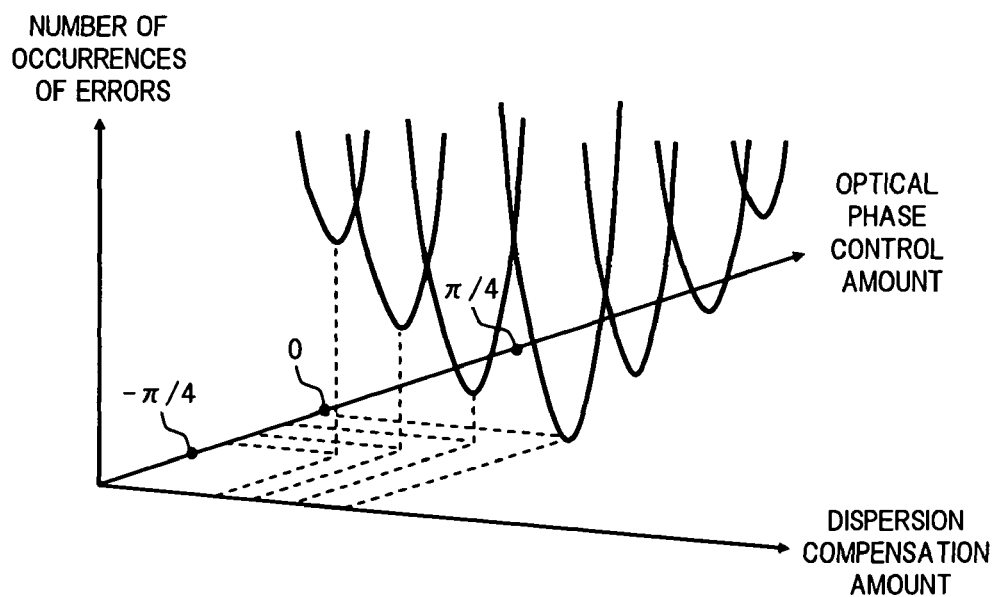
FIG. 19 is a diagram showing one example of a relation between a dispersion compensation amount, and an optical phase control amount, and the number of occurrences of errors in the conventional optical receiver.

Specifically, the configuration of the optical receiver 10E is basically the same as the abovementioned conventional configuration shown in FIG. 17, and the control circuit 17 includes a function for transmitting the control information for adjusting the optical output level of the optical transmitter 30 to the transmitter 30 by using the OSC signal. In the optical transmitter 30, for example, output power of a signal source (not shown) or gain of a post amplifier is adjusted according to the control information transmitted by means of the OSC signal from the optical receiver 10E.

Figure 14:
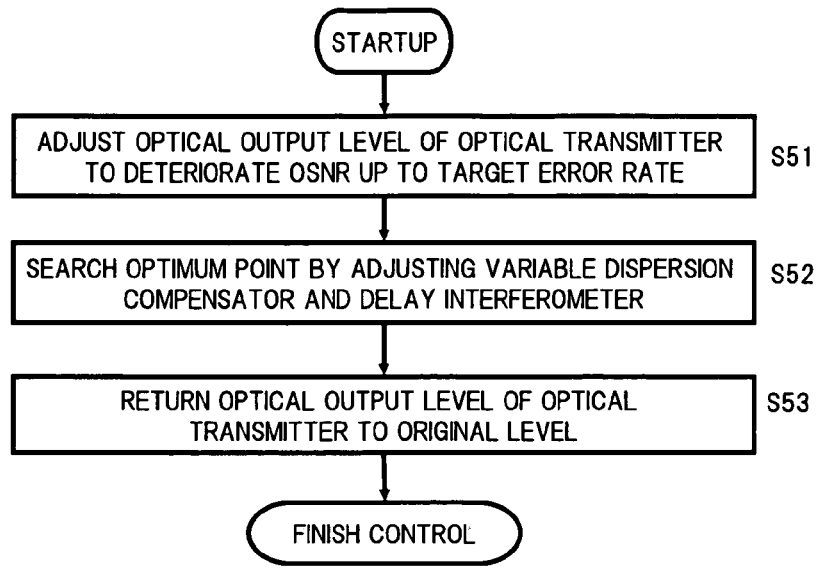
FIG. 14 is a flowchart showing one example of a specific controlling method in the fifth embodiment.
Figure 15:
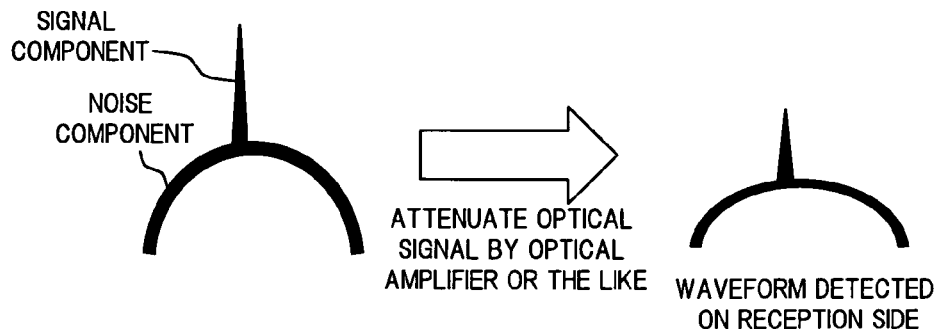
FIG. 15 is a conceptual diagram for explaining a situation in which OSNR of an optical signal is efficiently deteriorated in the fifth embodiment.
Figure 15:
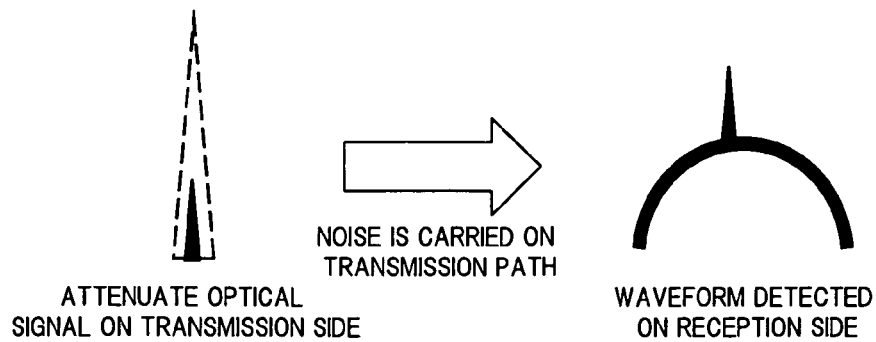
Figure 16:
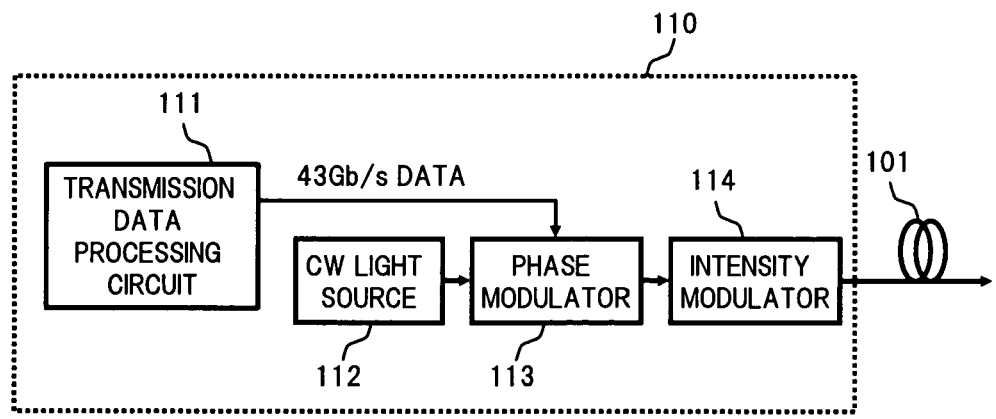
FIG. 16 is a block diagram showing a configuration example of a conventional optical transmitter.

FIG. 14 is a flowchart showing an example of specific control in the abovementioned optical transmission system. At the time of startup of the optical receiver 10E, in step 51 in FIG. 14, an OSC signal including the control information for decreasing the power of the optical signal transmitted from the optical receiver 30 to the transmission line 1 to a level determined based on the target error rate is generated, and the OSC signal is transmitted from the optical receiver 10E to the optical transmitter 30 via the opposite line. In the optical transmitter 30, the optical output level to the transmission line 1 is decreased according to the control information of the OSC signal. In this manner, since the optical signal power is decreased on the transmission side at the time of startup of the optical receiver 10E, as shown in a conceptual diagram in FIG. 15, the OSNR of the optical signal can be efficiently deteriorated as compared with a case in which the optical signal power of the optical amplifier 12 and the like on the reception side is decreased. That is, as shown in the upper part of FIG. 15, when the optical signal power is adjusted on the reception side, both of a signal component and a noise component included in the received optical signal are attenuated. On the other hand, as shown in the lower part of FIG. 15, when the optical signal power is adjusted on the transmission side, only the signal component is attenuated on the transmission side, and the noise is carried on the transmission line 1 with respect to the signal component. Accordingly, a waveform of the optical signal detected on the reception side has a higher proportion of the noise component when adjustment is performed on the transmission side, and hence, the OSNR can be efficiently deteriorated.

Then in step 52, optimization of the variable dispersion compensator 11 and the delay interferometer 13 is executed by the control circuit 17 as in the first embodiment. At this time, if the number of occurrences of errors detected on the reception side is transmitted to the transmission side by using the OSC signal and the like, the output level on the transmission side can also be adjusted according to the variation of the number of occurrences of errors occurring in the middle of optimization control on the reception side. When optimization of the variable dispersion compensator 11 and the delay interferometer 13 has finished, in step 53, the OSC signal including the control information for setting the optical signal power output from the optical transmitter 30 to the level at the time of normal operation is generated, and the OSC signal is transmitted from the optical receiver 10E to the optical transmitter 30 via the opposite line, thereby returning the optical output level of the optical transmitter 30 to the original level.

According to the abovementioned optical transmission system of the fifth embodiment, the optical output level of the optical transmitter 30 is decreased at the time of startup of the optical receiver 10E so as to efficiently monitor many errors within a short period of time. Accordingly, the time required for optimization of the variable dispersion compensator 11 and the delay interferometer 13 can be reduced.

In the abovementioned fifth embodiment, an example in which the optical output level on the transmission side is controlled using the OSC signal has been described. However the optical receiver can transmit an instruction for adjusting the optical output level to the optical transmitter using, for example, a server that monitors the entire optical transmission system, other than the OSC signal. Moreover, also in the fifth embodiment, the abovementioned control flow corresponding to optimization adjustment at the time of switching the path shown in FIG. 5 can be applied.

What is claimed is:

1. An optical receiver comprising:
   a variable dispersion compensating section that compensates wavelength dispersion of an input optical signal of a differential M-phase modulation format, where M=2n when n is a natural number;
   a delay interfering section that performs delay interference processing in which a one-bit delayed branched component and an optically phase-controlled branched component, of the optical signal dispersion-compensated by the variable dispersion compensating section, are made to interfere with each other;

a photoelectric converting section that performs photoelectric conversion detection with respect to an optical signal from the delay interfering section, to thereby output a demodulated electric signal corresponding to the differential M-phase modulation format;

an error monitor section that monitors information relating to an error rate of the electric signal output from the photoelectric converting section; and a control section that controls a dispersion compensation amount in the variable dispersion compensating section and an optical phase control amount in the delay interfering section, wherein the optical receiver further comprises a signal quality adjusting section that enables adjustment of a signal-to-noise ratio of the optical signal input to the photoelectric converting section, and the control section controls the signal quality adjusting section to deteriorate the signal-to-noise ratio of the optical signal input to the photoelectric converting section, to thereby realize a state in which the information monitored by the error monitor section corresponds to a preset target error rate, and then starts control of the variable dispersion compensating section and the delay interfering section.

2. An optical receiver according to claim 1, further comprising an optical amplifying section that amplifies the optical signal output from the variable dispersion compensating section, to compensate an optical loss in the variable dispersion compensating section, and the signal quality adjusting section enables adjustment of a signal-to-noise ratio of the optical signal input to the photoelectric converting section, by changing an output level of the optical amplifying section, and the control section decreases the output level of the amplifying section to a level set based on a target error rate, and then starts control of the variable dispersion compensating section and the delay interfering section, and returns the output level of the amplifying section to the original level by completing the control.

3. An optical receiver according to claim 1, wherein the signal quality adjusting section has a variable optical attenuator arranged on an optical path between the variable dispersion compensating section and the photoelectric converting section, that enables adjustment of a signal-to-noise ratio of the optical signal input to the photoelectric converting section, by changing the attenuation of the variable optical attenuator, and the control section increases the attenuation of the variable optical attenuator up to a value set based on a target error rate, and then starts control of the variable dispersion compensating section and the delay interfering section, and returns the attenuation of the variable optical attenuator to the original level by completing the control.

4. An optical receiver according to claim 1, wherein the signal quality adjusting section has an optical switch arranged on an optical path between the variable dispersion compensating section and the photoelectric converting section, that outputs the input optical signal to either one of a first optical path and a second optical path, and a fixed optical attenuator arranged on the second optical path, and the switching of the optical switch enables adjustment of a signal-to-noise ratio of the optical signal input to the photoelectric converting section, by switching the optical switch, and the control section sets the optical switch to the second optical path side, and then starts control of the variable dispersion compensating section and the delay interfering section, and switches the optical switch to the first optical path side by completing the control.

5. An optical receiver according to claim 1, including a reproducing section that extracts a clock signal from an electric signal output from the photoelectric converting section, to thereby reproduce a data signal, and the signal quality adjusting section enables adjustment of a number of occurrences of errors for the reproduced data by changing a threshold level of data identification processing in the reproducing section, instead of enabling adjustment of a signal-to-noise ratio of the optical signal input to the photoelectric converting section, and the control section shifts the threshold level of the reproducing section to a level set based on the target error rate, and then starts control of the variable dispersion compensating section and the delay interfering section, and returns the threshold level of the reproducing section to the original level by completing the control.

6. An optical receiver according to claim 1, wherein the control section performs control of the variable dispersion compensating section and the delay interfering section at the time of start up of the optical receiver.

7. An optical receiver according to claim 1, wherein the control section performs control of the variable dispersion compensating section and the delay interfering section when the transmission path of the input optical signal is switched.

8. An optical receiver according to claim 1, wherein the control section starts control of the variable dispersion compensating section and the delay interfering section, and then until completion of the control, controls the signal quality adjusting section, and realizes a state where information corresponding to the target error rate is monitored by the error monitor section.

9. An optical receiver according to claim 1, comprising an error correction section that performs error correction processing on the electrical signal output from the photoelectric converting section, and the error monitor section transmits the number of occurrences of errors detected by the error correction section to the control section, and the control section controls the signal quality adjusting section so that the number of occurrences of errors transmitted from the error monitor section becomes a value within a range of error correcting capability of the error correction section.

10. A controlling method in an optical receiver comprising: a variable dispersion compensating section that compensates wavelength dispersion of an input optical signal of a differential M-phase modulation format, where M=2n when n is a natural number; a delay interfering section that performs delay interference processing in which a one-bit delayed branched component and an optically phase-controlled branched component, of the optical signal dispersion-compensated by the variable dispersion compensating section, are made to interfere with each other; and a photoelectric converting section that performs photoelectric conversion detection with respect to an optical signal from the delay interfering section, to thereby output a demodulated electric signal corresponding to the differential M-phase modulation format; that monitors information related to an error rate of an electric signal output from the photoelectric converting section, and controls the dispersion compensation amount in the variable dispersion compensating section and the optical phase control amount in the delay interfering section, based on the monitor information, the method comprising deteriorating the signal-to-noise ratio of the optical signal input to the photoelectric converting section, to thereby realize a state in which the monitored information corresponds to a preset target error rate, and then starting control of the variable dispersion compensating section and the delay interfering section.

11. An optical transmission system comprising; an optical transmitter that generates an optical signal of a differential M-phase modulation format, where M=2n when n is a natural number, and outputs this to a transmission path, and an optical receiver that receives and processes the optical signal transmitted on the transmission path, wherein the optical receiver comprises:

a variable dispersion compensating section that compensates wavelength dispersion of an input optical signal transmitted on the transmission path;

a delay interfering section that performs delay interference processing in which a one-bit delayed branched component and an optically phase-controlled branched component, of the optical signal dispersion-compensated by the variable dispersion compensating section, are made to interfere with each other;

a photoelectric converting section that performs photoelectric conversion detection with respect to an optical signal from the delay interfering section, to thereby output a demodulated electric signal corresponding to the differential M-phase modulation format;

an error monitor section that monitors information relating to an error rate of the electric signal output from the photoelectric converting section; and a control section that controls a dispersion compensation amount in the variable dispersion compensating section and an optical phase control amount in the delay interfering section, and furthermore the control section transmits control information for decreasing the optical output level of the optical transmitter to the optical transmitter, to thereby realize a state in which the information monitored by the error monitor section corresponds to a preset target error rate, and then starts control of the variable dispersion compensating section and the delay interfering section, and transmits control information for returning the optical output level of the optical transmitter to the optical transmitter, by completing the control.

12. An optical transmission system according to claim 11, wherein the optical receiver transmits the control information to the optical transmitter using a signal for system supervising.

13. An optical transmission system according to claim 11, wherein the optical receiver transmits the control information to the optical transmitter using a server that monitors the entire system.

* * * * *